United States Patent
Smith

(10) Patent No.: US 7,072,735 B2
(45) Date of Patent: Jul. 4, 2006

(54) CONTROL SYSTEM FOR UTILIZING ACTIVE MATERIAL ELEMENTS IN A MOLDING SYSTEM

(75) Inventor: Derek K. W. Smith, Richmond Hill (CA)

(73) Assignee: Husky Injection Molding Systems Ltd. (CA)

( * ) Notice: Subject to any disclaimer, the term of this patent is extended or adjusted under 35 U.S.C. 154(b) by 101 days.

(21) Appl. No.: 10/830,437

(22) Filed: Apr. 23, 2004

(65) Prior Publication Data

US 2005/0240303 A1 Oct. 27, 2005

(51) Int. Cl.
*B29C 45/00* (2006.01)

(52) U.S. Cl. .................. 700/201; 700/197; 700/200; 700/204; 700/203; 29/848; 29/849; 425/149; 426/512; 426/517; 264/297.2; 264/297.3; 156/125

(58) Field of Classification Search ................ 700/197, 700/198, 199, 200, 201, 204, 203; 29/848, 29/849; 425/149; 426/512, 517; 156/125; 264/297.2, 297.3

See application file for complete search history.

(56) References Cited

U.S. PATENT DOCUMENTS

| 4,420,454 A | 12/1983 | Kawaguchi et al. |
| 4,469,649 A | 9/1984 | Ibar |
| 4,489,771 A | 12/1984 | Takeshima et al. |
| 4,556,377 A * | 12/1985 | Brown ........................ 425/138 |
| 4,588,367 A | 5/1986 | Schad |
| 4,660,801 A | 4/1987 | Schad |
| 4,828,769 A * | 5/1989 | Maus et al. ................. 264/1.31 |
| 4,995,445 A | 2/1991 | Mathur |
| 5,192,555 A | 3/1993 | Arnott |
| 5,237,238 A | 8/1993 | Berghaus et al. |
| 5,238,389 A * | 8/1993 | Brandau et al. ............ 425/522 |
| 5,397,230 A | 3/1995 | Brew |
| 5,439,371 A | 8/1995 | Sawaya |
| 5,683,730 A | 11/1997 | Katsumata et al. |
| 5,853,776 A | 12/1998 | Meijer |
| 6,203,747 B1 * | 3/2001 | Grunitz ...................... 264/443 |

(Continued)

FOREIGN PATENT DOCUMENTS

EP 0 448 855 A1 10/1991

OTHER PUBLICATIONS marco: Structure and characteristics of piezokeramisher pile actuators [online], marco Systemanalyse und Entwicklung GmbH, Sep. 16, 2003 Translated Version (from German to English by Yahoo translation tool) [retrieved on Oct. 13, 2004] <URL http://www.marco.de./E/D/pa/017.html>.

(Continued)

*Primary Examiner*—Ramesh Patel
(74) *Attorney, Agent, or Firm*—Katten Muchin Rosenman LLP

(57) ABSTRACT

Method and apparatus for controlling an injection molding machine having a first surface and a second surface includes a piezo-ceramic sensor configured to be disposed between the first surface and a second surface. The piezo-ceramic sensor is configured to sense a force between the first surface and the second surface, and to generate corresponding sense signals. Transmission structure is coupled to the piezo-ceramic sensor and is configured to carry the sense signals. Preferably, a piezo-ceramic actuator is also disposed between the first surface and a second surface, and is configured to provide an expansive force between the first surface and a second surface in accordance with the sense signals.

19 Claims, 2 Drawing Sheets

U.S. PATENT DOCUMENTS 6,289,259 B1 * 9/2001 Choi et al. .................. 700/197
6,343,925 B1 2/2002 Jenko
6,629,831 B1 10/2003 Wei et al.
6,720,712 B1 * 4/2004 Scott et al. .................. 310/339

OTHER PUBLICATIONS

Piezo Square Stack Actuators: pss . . . [online], marco Systemanalyse und Entwicklung GmbH, Jan. 19, 2004, [retrieved on Oct. 13, 2004], <URL http://www.marco.de/E/D/pss/001.html>.

Piezoceramic Stack Actuators: pa/ps [online], marco Systemanalyse und Entwicklung GmbH, Feb. 17, 2004, [retrieved on Oct. 13, 2004], <URL http//www.marco.de/E/D/pa/ps/007.html>.

Mide: Active Materials [online] Mide Teccnology Corporation, [retrieved on Oct. 13, 2004] <URL http://www.mide.com/active_materials.html>.

William J. Tobin, "Venting from the Inside", Plastics, Machinery & Equipment, Feb. 1990, p. 55.

* cited by examiner

CONTROL SYSTEM FOR UTILIZING ACTIVE MATERIAL ELEMENTS IN A MOLDING SYSTEM

BACKGROUND OF THE INVENTION

1. Field of the Invention

The present invention relates to a method and apparatus in which control systems are used to regulate various aspects of injection molding machine equipment (e.g., insert stacks or hot runner nozzle assemblies) in conjunction with active material element sensors and actuators. "Active materials" are a family of shape altering materials such as piezoactuators, piezoceramics, electrostrictors, magnetostrictors, shape memory alloys, and the like. Such control systems may be used in an injection mold to counter deflections in the mold structure, aid in ejection of molded articles, and apply vibration and/or compression to melt, thereby improving the quality of the molded articles and the life of the mold components. Injection molding equipment includes both molding a melt of plastic material and molding a melt of metal material, for example, a metal in a thixotropic state.

2. Related Art

Active materials are characterized as transducers that can convert one form of energy to another. For example, a piezoactuator (or motor) converts input electrical energy to mechanical energy causing a dimensional change in the element, whereas a piezosensor (or generator) converts mechanical energy—a change in the dimensional shape of the element—into electrical energy. One example of a piezoceramic transducer is shown in U.S. Pat. No. 5,237,238 to Berghaus. Marco Systemanalyse und Entwicklung GmbH is a supplier of peizoactuators located at Hans-Böckler-Str. 2, D-85221 Dachau, Germany, and their advertising literature and website illustrate such devices. Typically, an application of 1,000 volt potential to a piezoceramic insert will cause it to "grow" approximately 0.0015"/inch (0.15%) in thickness. Another supplier, Mide Technology Corporation of Medford, Me., has a variety of active materials including magnetostrictors and shape memory alloys, and their advertising literature and website illustrate such devices, including material specifications and other published details.

Intelligent processing is known in the art of injection molding. For example, U.S. Pat. No. 6,289,259 to Choi et al. discloses an intelligent hydraulic manifold device. A microcontroller is electrically coupled to a system controller to provide distributed control within the hydraulic circuit of an injection molding machine.

SUMMARY OF THE INVENTION

It is an advantage of the present invention to provide an injection molding machine with control apparatus to overcome the alignment and other mechanical problems commonly encountered in injection molding machines and mold components, and to provide an advantageous, efficient means for detecting and/or correcting mechanical misalignments in an injection molding machine.

According to a first aspect of the present invention, structure and/or function are provided for a control apparatus for a mold having a first surface and a second surface, including a piezo-ceramic sensor configured to be disposed between the first surface and the second surface of the injection mold, for sensing a compressive force between the first surface and the second surface and generating a corresponding sense signal, and transmission structure configured to transmit, in use, the sense signal from said piezo-ceramic sensor.

According to a second aspect of the present invention, structure and/or function are provided for a control apparatus for an injection molding machine having a first surface and a second surface, including a piezo-ceramic actuator configured to be disposed between the first surface and the second surface of the injection molding machine, for receiving an actuation signal and generating a corresponding expansion force between the first surface and the second surface, and transmission structure configured to transmit, in use, the actuation signal to said piezo-ceramic actuator.

According to a third aspect of the present invention, structure and/or function are provided for an apparatus for controlling deflection between first and second surfaces of a mold including a piezo-ceramic actuator configured to be disposed between the first second surfaces of the injection molding machine, for receiving an actuation signal, and for generating an expansive force between the first and second surfaces, and a piezo-ceramic sensor disposed adjacent said piezo-ceramic actuator, for detecting changes in a width of said piezo-ceramic actuator and generating sensor signals corresponding thereto.

BRIEF DESCRIPTION OF THE DRAWINGS

Exemplary embodiments of the presently preferred features of the present invention will now be described with reference to the accompanying drawings in which.

DETAILED DESCRIPTION OF THE PRESENTLY PREFERRED EXEMPLARY EMBODIMENTS

1. Introduction

Figure 1:
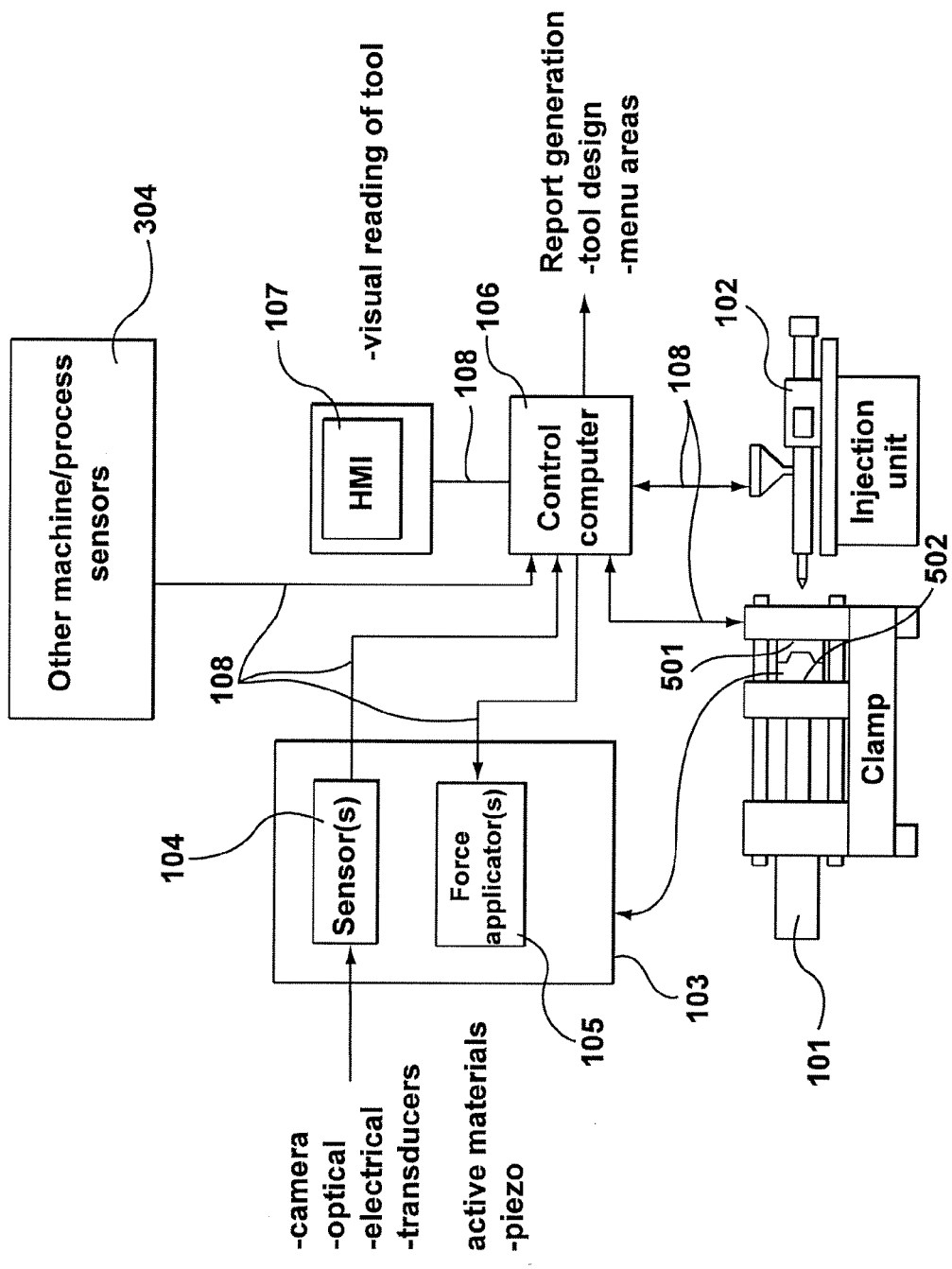
FIG. 1 depicts a schematic diagram of a control system for a first embodiment of the invention.

The present invention will now be described with respect to several embodiments in which injection-molding machines and injection molds are linked to control systems including a controller and one or more active material elements. The control systems serve to aid in correcting alignment problems in injection molds and molding machines, and particularly injection mold cores, and are useful in correcting a number of other problems. The control systems may be placed in any location in the injection molding apparatus in which alignment/sealing problems could be encountered. Other applications for such control systems are discussed in the following related applications: (1) U.S. patent application Ser. No. 10/830,435, filed concurrently on Apr. 23, 2004, entitled "Method and Apparatus for Assisting Ejection from an Injection Molding Machine Using Active Material Elements", (2) U.S. patent application Ser. No. 10/830,403, filed concurrently on Apr. 23, 2004, entitled "Method and Apparatus for Adjustable Hot Runner Assembly Seals and Tip Height Using Active Material Elements", (3) U.S. patent application Ser. No. 10/830,438, filed concurrently on Apr. 23, 2004, entitled "Method and Apparatus for Controlling a Vent Gap with Active Material Elements", (4) U.S. patent application Ser. No. 10/830,485, filed concurrently on Apr. 23, 2004, entitled "Method and Apparatus for Mold Component Locking Using Active Material Elements", (5) U.S. patent application Ser. No. 10/830,488, filed concurrently on Apr. 23, 2004, entitled "Method and Apparatus for Vibrating Melt in an Injection Molding Machine Using Active Material Elements", (6) U.S. patent application Ser. No. 10/830,436, filed concurrently on Apr. 23, 2004, entitled "Method and Apparatus for Injection Compression Molding Using Active Material Elements", and (7) U.S. patent application Ser. No. 10/830,434, filed concurrently on Apr. 23, 2004, entitled "Method and Apparatus for Countering Mold Deflection and Misalignment Using Active Material Inserts".

None of the prior injection molding machines or injection molds employ devices such as control systems including active material inserts to coordinate receipt of signals from active material sensors with output signals to active material actuators, so as to provide real time controlled loop feedback in an injection molding system. Such a control system may be used, for example, to detect pressure between mold components, adjust alignment of mold components, vibrate and/or compress melt within mold cavities, assist in ejecting molded parts from mold cores, as well as many additional applications.

In the following control system description, piezoceramic inserts are described as the preferred active material, however, other materials from the active material family, such as magnetostrictors, shape memory alloys, piezoactuators, piezoceramics, electrostrictors, and the like could also be used in accordance with the present invention. A list of possible alternate active materials and their characteristics are set forth below in Table 1, and any of these active materials could be used in accordance with the present invention:

The active material element may comprise any of the devices manufactured by Marco Systemanalyse und Entwicklung GmbH. The piezo-electric sensor 104 will detect the pressure applied thereto, and transmit a corresponding sense signal through wiring connections 108. The piezo-electric actuator 105 will receive an actuation signal through the wiring connections 108 and apply a corresponding force between the platens of tool 103. Note that more than one piezo-electric sensor 104 may be provided to sense pressure from any desired position. Likewise, more than one piezo-electric actuator 105 may be provided, mounted serially or in tandem, in order to effect extended movement, angular movement, etc., of the platens.

The computer control system or processing circuitry 106 receives the piezo-electric sensor signals and/or provides the actuation signals to the piezo-electric actuators. For example, one or more general-purpose computers, Application Specific Integrated Circuits (ASICs), Digital Signal Processors (DSPs), gate arrays, analog circuits, dedicated digital and/or analog processors, hard-wired circuits, etc., may control or sense the active material elements described herein. Instructions for controlling the one or more processors may be stored in any desirable computer-readable medium and/or data structure, such floppy diskettes, hard drives, CD-ROMs, RAMs, EEPROMs, magnetic media, optical media, magneto-optical media, etc.

Also connected to the computer control system is a human machine interface (HMI) 107 that includes output devices for the visual display of data and menu options. The interface preferably includes input devices such as keypads or touch sensitive screen areas to allow the operator to provide

TABLE 1

Comparison of Active Materials

| Material | Temperature Range (° C.) | Nonlinearity (Hysteresis) | Structural Integrity | Cost/Vol. ($/cm3) | Technical Maturity |
|---|---|---|---|---|---|
| Piezoceramic PZT-5A | −50–250 | 10% | Brittle Ceramic | 200 | Commercial |
| Piezo-single crystal TRS-A | — | <10% | Brittle Ceramic | 32000 | Research |
| Electrostrictor PMN | 0–40 | Quadratic <1% | Brittle Ceramic | 800 | Commercial |
| Magnetostrictor Terfenol-D | −20–100 | 2% | Brittle | 400 | Research |
| Shape Memory Alloy Nitinol | Temp. Controlled | High | OK | 2 | Commercial |
| Magn. Activated SMA NiMnGa | <40 | High | OK | 200 | Preliminary Research |
| Piezopolymer PVDF | −70–135 | >10% | Good | 15* | Commercial |

(information derived from www.mide.com)

2. The Structure of the First Embodiment

A first preferred embodiment of the present invention is set forth in FIG. 1, which is a schematic diagram of an injection molding machine comprising a clamp 101 and injection unit 102 has a tool 103 installed between surfaces 501, 502 of its platens. The tool 103 contains (i) one or more sensors 104 and (ii) one or more force applicators 105, either of which is an active material element of the type previously described. The sensor 104 can also be a camera or other optical or electrical transducer providing input data. A computer control system 106, which may be either part of the injection molding machine controls or an independent system positioned adjacent to the machine, is connected to the sensor and force applicator for processing the sensor data and providing command signals to the force applicator 105.

data, instructions, or responses to requests from the injection molding machine control system.

In addition, other machine process and equipment sensors 304 are connected to the control computer 106. The sensors 304 monitor temperature, shot size, injection pressure, mold open, mold closed, clamp up, and cooling time to provide a real time indication of the injection molding process for the particular part being molded.

3. The Process of the First Embodiment

In operation, the control computer 106 receives data generated by the sensors 104 provided in the tool 103, and/or data generated by the sensors 304, and that data is transmitted within the control system via electrical conduits 108. The control computer 106 processes the received data in real-time using software, logic, or algorithms programmed into said control computer based upon the type of molding application being performed, and the operator's input through the HMI 107.

Based on the calculations performed by the control computer 106, output data is generated and transmitted to active material actuators 105 via electrical conduits 108. The actuators 105 respond to the output data in accordance with their manufacturing specifications to apply sealing pressure to mold components within tool 103, move mold components, align injection molding nozzle components, eject molded parts from mold components, and any of a number of additional beneficial injection molding applications.

4. The Structure of the Second Embodiment

Figure 2:
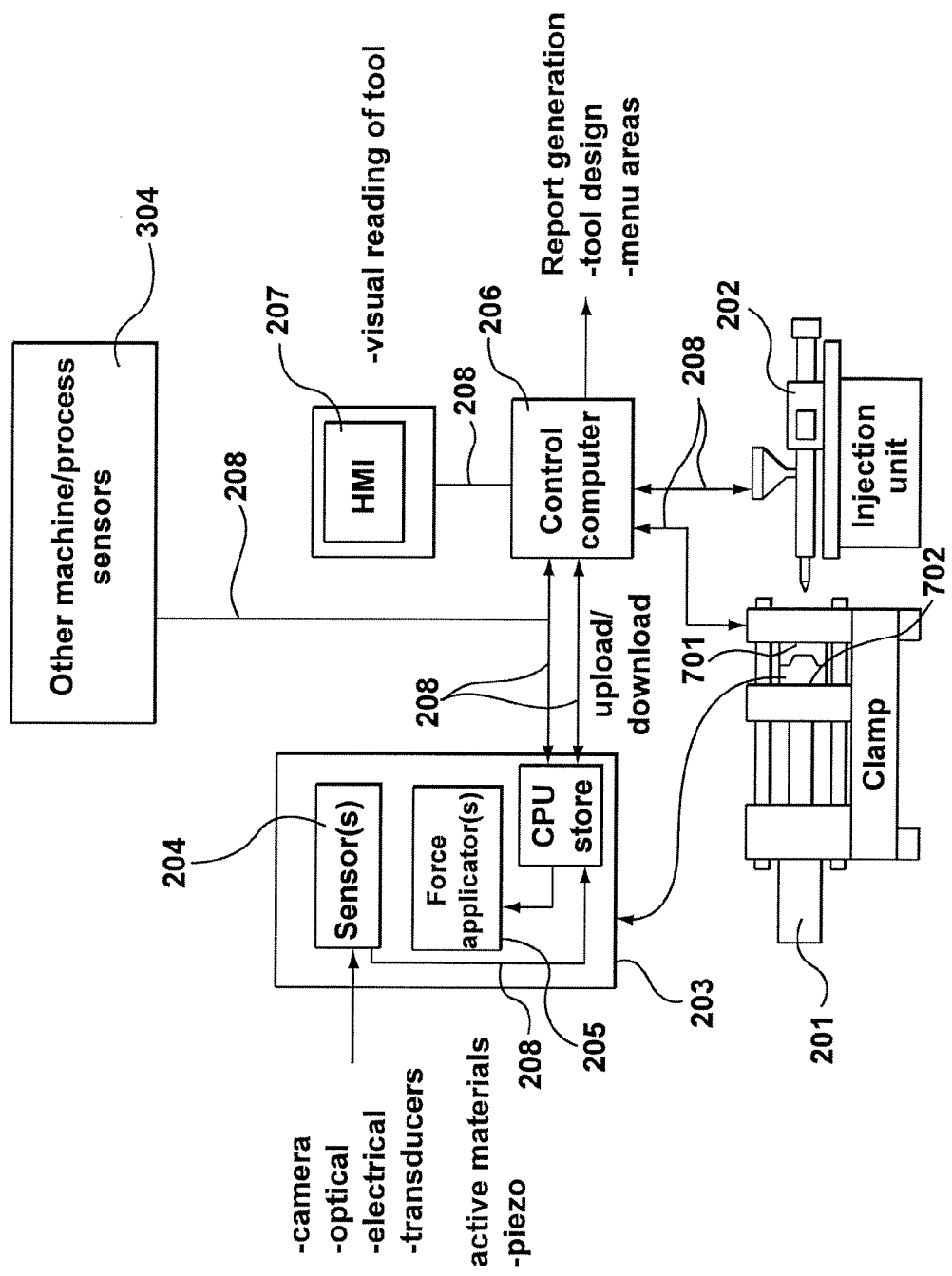
FIG. 2 depicts a schematic diagram of a control system for a second embodiment of the invention.

FIG. 2 shows a second preferred embodiment of the present invention, including an injection molding machine comprising a clamp 201 and an injection unit 202 having a tool 203 installed between surfaces 701, 702 of its platens. The tool 203 contains (i) one or more sensors 204 and (ii) one or more force applicators 205, either of which is an active material element of the type previously described. The sensor 204 can also be a camera or other optical or electrical transducer providing input data. A computer control system 206, that forms part of the injection molding machine controls is connected to the sensor 204 and force applicator 205 for processing the sensor data and providing command signals to the force applicator 205.

According to this second embodiment, a computer processor 209 and storage device 210 are provided, and are preferably mounted directly with the tool 203. This provides the advantage of retaining specific process data and information with the tool 203 such that changing the tool results in faster initiation of the molding process. Preferably, the CPU store is located with the cold half of the mold. Alternatively, the CPU store may be located with the hot half of the mold with appropriate thermal insulation to protect the electrical components from the heat of the mold. Alternatively, the computer processor may be mounted near the mold in the clamp area of the machine, or the computer processor may be mounted with the machine controller 206.

The processor 209 communicates with the machine controller 206 via communication lines 211 intermittently for uploading and downloading data and instructions. The processor 209 onboard the tool 203 is sufficiently equipped to process the sensor signals and send corresponding command signals to the force applicator 205 based on a predetermined set of algorithms and instructions programmed in its software. In addition, other machine process and equipment sensors 304 are connected to the control computer 106 and to the CPU store associated with the tool 203. The sensors 304 monitor temperature, shot size, injection pressure, mold open, mold closed, clamp up, and cooling time, to provide a real time indication of the injection molding process for the particular part being molded. The CPU store having direct access to data and information from the sensors 304 may completely control the mold independent of the control computer 206.

An HMI 207 is also provided in accordance with this embodiment to accept user input and solicit responses to queries generated by the control computer 206.

5. The Process of the Second Embodiment

In operation, the control system of the second embodiment also receives data generated by the sensors 204 provided in the injection mold between platens of tool 203, and that data is also transmitted to the computer 209 via electrical conduits 208. Sensors 304 also provide data and information to the CPU of the tool 203. The onboard location of the control system shortens the communication configuration between sensor 204, computer processor 209 and force applicator 205, thereby optimizing the response time and therefore the quality of control that can be provided in this configuration. Processing times are accelerated by the proximity of the control system computer 209 to the injection molding machine controller 206, and the shorter electrical conduits or connections 208 enabled by locating the control system on the tool itself.

The control system processes the received data in realtime using software, logic, or algorithms programmed into said control system based upon the type of molding application being performed, and the operator's input through the HMI 207.

6. Exemplary Applications

The preferred embodiments of the present invention for providing control systems for injection molding machines will now be described with respect to a number of exemplary applications of such control systems in connection with injection molding machines and injection molds. The following examples are not to be considered limiting, and are merely provided as examples of possible uses of the control systems according to the present invention.

EXAMPLE A

A piezoceramic ejector ring is provided between a core and a stripper ring of an injection mold comprising a core, a stripper ring, and vent pins. After a molded part has been freshly formed on the core, and sufficient cooling has occurred to permit handling of the part without causing deformation, the part is ready to be ejected off of the core. The piezoceramic ejector ring is an active material element is connected to the controller system by wiring that sends electrical signals to the ejector ring to cause the ejector ring to increase in height. The connections could be to the CPU store in the tool 203 to the control computer 106. The piezoceramic ejector ring may be activated by either the CPU store 203 or the control computer 106 based upon sensing the mold open position, or the start of the mold open position. This action causes the part to be lifted from the core an initial distance, and conventional means may then be used to complete the ejection process.

EXAMPLE B

A piezoceramic insert is provided between in a core or a cavity of an injection mold comprising a core, a cavity and ejection means. During the injection of a molded part in the cavity the insert is used to control the vent gap in the mold thereby aiding or delaying the rate of filling of the plastic in the cavity during injection. The piezoceramic insert is an active material element and is connected to the controller system by wiring that sends electrical signals to the insert to cause the increase or reduce the vent gap. Alternatively, the piezoceramic insert may be connected to the CPU store in the tool 103 and the CPU store controls and sends the electrical signals to increase or reduce the vent gap. This processing capability and data is retained with the CPU store. This action causes the rate of injection of plastic filling the mold cavity to be varied. This may be based upon sensing both the injection pressure and speed of injection for a particular part and plastic material.

EXAMPLE C

A piezoceramic insert is provided between a movable core component and a mold structural component of an injection mold comprising a core, a cavity, a core, a movable core component, mold structural components and ejection means. The wearing surfaces of the movable core component and/or the mating structural component is compensated for by the insert. The piezoceramic insert is an active material element and is connected to the controller system by wiring that sends electrical signals to the insert to cause the insert to increase in height. Alternatively, the piezoceramic insert may be connected to the CPU store in the tool 103 and the CPU store controls and sends the electrical signals to increase or reduce the vent gap. This processing capability and data is retained with the CPU store. This action causes the clearance created by wear to be filled by the increased height of the insert thereby prolonging the useful life of the mold between maintenance work.

EXAMPLE D

A piezoceramic actuator is provided in a molding system. During or after a molded part has been freshly formed in the mold the actuator is energized to impart a vibration into the melt during injection or immediately thereafter prior to the melt's solidification. The piezoceramic actuator is an active material element and is connected to the controller system by wiring that sends alternating electrical signals to the actuator to cause the actuator to rapidly change in height. Alternatively, the piezoceramic insert may be connected to the CPU store in the tool 103 and the CPU store controls and sends the electrical signals to increase or reduce the vent gap. This processing capability and data is retained with the CPU store. This action causes the melt to be vibrated prior to solidification to improve weld lines and better distribute the melt in the cavity thereby improving the integrity and homogeneity of the molded part. Melt vibration is initiated after sensing injection into the mold.

EXAMPLE E

A piezoceramic insert is provided between a core and a core plate of an injection mold. During or after a molded part has been freshly formed on the core, the actuator is energized to correct any misalignment detected between the core and the core plate. The piezoceramic actuator is an active material element and is connected to the controller system by wiring that sends electrical signals to the ejector ring to cause the actuator to increase in height. Alternatively, the piezoceramic insert may be connected to the CPU store in the tool 103 and the CPU store controls and sends the electrical signals to increase or reduce the vent gap. This processing capability and data is retained with the CPU store. This action causes the core to be lifted from the core plate either completely or at an angle to compensate for sensed misalignment.

EXAMPLE F

A piezoceramic insert is provided at various locations in a hot runner system of an injection mold. During the injection of a molded part the actuators may be energized to cause various components in the hot runner system to seal against each other thereby minimizing leakage of the hot plastic during injection. The piezoceramic actuators are active material elements and are connected to the controller system by wiring that sends electrical signals to the actuators to cause the actuators to increase in height. Alternatively, the piezoceramic insert may be connected to the CPU store in the tool 103 and the CPU store controls and sends the electrical signals to increase or reduce the vent gap. This processing capability and data is retained with the CPU store. This action causes the parts in contact with the actuators to be urged against their counterparts to ensure a seal is maintained.

EXAMPLE G

A piezoceramic actuator is provided between a core and a core plate of an injection mold. During or after a molded part has been freshly formed on the core the actuator is energized to cause the core to advance into the molded part thereby reducing its wall thickness. The piezoceramic actuator is an active material element and is connected to the controller system by wiring that sends electrical signals to the actuator to cause the actuator ring to increase in height. Alternatively, the piezoceramic insert may be connected to the CPU store in the tool 103 and the CPU store controls and sends the electrical signals to increase or reduce the vent gap. This processing capability and data is retained with the CPU store. This action causes the core to be lifted from the core plate an initial distance thereby reducing the wall thickness of the molded part formed by the core and in sensed after injection of the melt of material.

7. Conclusion

Thus, what has been described is a control system method and apparatus for using active material elements in an injecting molding machine, separately and in combination, to effect useful improvements in injection molding apparatus.

Advantageous features according the present invention include: 1. A control system used in conjunction with one or more active material elements to generate a force or sense a force in an injection molding apparatus and respond to that force in real time; 2. The counteraction of deflection in molding apparatus by a closed loop controlled force generator including a control system; and 3. The correction of core shifting in a molding apparatus by a locally applied force generator exerting a predetermined force computed by a control system using from data measured from previously molded parts.

While the present invention provides distinct advantages for the control of injection molding machines, and particularly for closed-loop automated control of injection molding machines, those skilled in the art will realize the invention is equally applicable to automated control of other industrial apparatus and processes. All such control systems and methods come within the scope of the appended claims.

The individual components shown in outline or designated by blocks in the attached Drawings are all well-known in the injection molding arts, and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

All U.S. and foreign patent documents discussed above (and particularly the applications discussed above in paragraph [0011]) are hereby incorporated by reference into the Detailed Description of the Preferred Embodiment.

What is claimed is:

1. Control apparatus for a mold having a first surface and a second surface, comprising:
a piezo-ceramic sensor configured to be disposed between the first surface and the second surface of the injection mold, for sensing a compressive force between the first surface and the second surface and generating a corresponding sense signal; and
transmission structure configured to transmit, in use, the sense signal from said piezo-ceramic sensor.

2. Apparatus according to claim 1, further comprising a piezo-ceramic actuator configured to be disposed between the first surface and the second surface, for receiving an actuation signal and generating a corresponding force between the first surface and the second surface, and wherein said transmission structure is configured to transmit the actuation signal to said piezo-ceramic actuator.

3. Apparatus according to claim 2, further comprising a plurality of piezo-ceramic sensors and a plurality of piezo-ceramic actuators, each configured to be disposed between the first surface and the second surface.

4. Control apparatus for an injection molding machine having a first surface and a second surface, comprising:
a piezo-ceramic actuator configured to be disposed between the first surface and the second surface of the injection molding machine, for receiving an actuation signal and generating a corresponding expansion force between the first surface and the second surface; and
transmission structure configured to transmit, in use, the actuation signal to said piezo-ceramic actuator.

5. Apparatus according to claim 4, further comprising a piezo-ceramic sensor configured to be disposed between the first surface and the second surface, for sensing a compressive force between the first surface and the second surface and generating a corresponding sense signal, and wherein said transmission structure is configured to transmit, in use, the sense signal from said piezo-ceramic sensor.

6. Apparatus according to claim 5, further comprising a plurality of piezo-ceramic sensors and a plurality of piezo-ceramic actuators, each configured to be disposed between the first surface and the second surface.

7. Apparatus for controlling deflection between first and second surfaces of a mold, comprising:
a piezo-ceramic actuator configured to be disposed between the first second surfaces of the injection molding machine, for receiving an actuation signal, and for generating an expansive force between the first and second surfaces; and
a piezo-ceramic sensor disposed adjacent said piezo-ceramic actuator, for detecting changes in a width of said piezo-ceramic actuator and generating sensor signals corresponding thereto.

8. Apparatus according to claim 7, further comprising processor structure for receiving the sensor signal from said piezo-ceramic sensor and transmitting a corresponding actuation signal to said piezo-ceramic actuator using closed lop control.

9. Apparatus according to claim 8, further comprising a plurality of piezo-ceramic sensors and a plurality of piezo-ceramic actuators, each configured to be disposed between the first and second surfaces of the injection molding machine.

10. Apparatus for correcting core shifting in a mold having a core and a core plate, comprising:
a plurality of piezo-electric actuators configured to be disposed about a periphery of the core, each for generating an expansive force between the core and the core plate, each of said plurality of piezo-electric actuators configured to be separately controllable;
transmission structure configured to provide an actuation signal, in use, to each of said plurality of piezo-electric actuators; and
control structure configured to provide the actuation signals to selected ones of said plurality of piezo-electric actuators to correct for core shifting.

11. Apparatus according to claim 10, further comprising a plurality of piezo-electric sensors configured to be disposed about the periphery of the core, each for sensing a compressive force between the core and the core plate and generating a corresponding sense signal, and wherein said transmission structure is configure to transmit the sense signals to said control structure.

12. Apparatus according to claim 11, wherein each piezo-electric sensor is disposed adjacent a corresponding piezo-electric actuator.

13. A method of controlling an injection mold having a first surface and a second surface, comprising the steps of:
sensing a compressive force between the first surface and the second surface with a piezo-ceramic sensor disposed between the first surface and the second surface of the injection mold;
generating a sense signal corresponding to the sensed compressive force;
transmitting the sense signal from the piezo-ceramic sensor to a processor;
generating an injection mold control signal according to the transmitted sense signal.

14. A method according to claim 13, wherein the control signal comprises at least one of (i) a clamping force signal, (ii) an injection pressure signal, and (iii) an injection rate signal.

15. A method according to claim 13, further comprising the steps of:
calculating an actuation signal corresponding to the transmitted sense signal; and
using the piezo-ceramic actuator to generate an expansive force between the first surface and the second surface corresponding to the actuation signal.

16. A method according to claim 13, further comprising the step of disposing a plurality of piezo-ceramic sensors and a plurality of piezo-ceramic actuators between the first surface and the second surface.

17. A method of controlling an injection mold having a first surface and a second surface, comprising the steps of:
determining a force actuation signal to control a space between the first surface and the second surface;
transmitting the force actuation signal to a piezo-ceramic actuator disposed between the first surface and the second surface of the injection mold; and
using the piezo-ceramic actuator to generate an corresponding expansion force between the first surface and the second surface.

18. A method according to claim 17, further comprising the steps of:

using the piezo-ceramic actuator to sense a compressive force between the first surface and the second surface;

generating a sense signal corresponding to the sensed compressive force; and transmitting the sense signal from the piezo-ceramic sensor to a controller.

19. A method according to claim 17, further comprising the steps of:

using the piezo-ceramic sensor to detect width changes in the piezo-ceramic actuator, and to generate feedback signals corresponding to the detected width changes; and real-time closed loop controlling the piezo-ceramic actuator in accordance with the feedback signals.

* * * * *